UNITED STATES PATENT OFFICE.

ANSON GARDNER BETTS, OF TROY, NEW YORK.

PROCESS OF MAKING MANGANESE AND FERROMANGANESE.

No. 905,281.  Specification of Letters Patent.  Patented Dec. 1, 1908.

Application filed February 21, 1908. Serial No. 417,162.

*To all whom it may concern:*

Be it known that I, ANSON GARDNER BETTS, a citizen of the United States, residing at Troy, in the county of Rensselaer and State of New York, have invented certain new and useful Improvements in Processes of Making Manganese and Ferromanganese, of which the following is a specification.

This invention relates to the recovery of manganese from ores and metallurgical slags.

The object of my invention is to recover manganese cheaply from ores and slags, collecting any precious metals present separately from the manganese, and preparing manganese subsequently in a state of greater or less purity. These objects are achieved by smelting the raw material being treated in a smelting furnace, collecting any precious metals or any copper or lead as a matte or bullion, and fractionally precipitating from the slag first mainly iron and then mainly manganese by treating the slag with metallic silicon, or a silicid or other reduction-product of silica. In this way the manganese and iron contents may be recovered separately to a great extent.

In the practice of my present invention, as applied to manganese ores, I add the ore preferably to the charge of a copper or lead smelting furnace, and then recover the manganese from the resulting slag.

The slags are treated preferably by running them into a suitable furnace or "forehearth" to which is also continuously added silicon, or a silicid, or other suitable reduction-product of silicon, in quantity sufficient to remove the iron, and a small part of the manganese. The resulting slag is then further treated in the same manner in another furnace with a further quantity of silicon, etc., to separate the manganese.

By using a quantity of silicon, etc., insufficient to precipitate all the iron from the slag in the first treatment, the manganese may be made to contain various amounts of iron.

In the claims by the word silicon I mean to include alloys of silicon, and silicids, and by the words metallic manganese I mean to include manganese alloys.

What I claim as new and desire to secure by Letters Patent, is—

1. The process of making metallic manganese which consists in treating a slag containing iron and manganese with a reduction product of silica, and precipitating iron thereby, and further treating the slag with a reduction-product of silica, and thereby separating manganese from the slag.

2. The process of making metallic manganese which consists in treating a slag containing iron and manganese with silicon, and precipitating iron thereby, and further treating the slag with a further quantity of silicon, and thereby separating manganese from the slag.

3. The process of making manganese from manganese ores which consists in separating precious metals therefrom by smelting, and separating manganese from the resulting slag by reacting thereon with silicon.

In testimony whereof I have hereunto signed my name in the presence of two subscribing witnesses.

ANSON GARDNER BETTS.

Witnesses:
FREDERICK CLARK,
WALTER B. BARNHISEL.